Patented July 6, 1926.

1,591,728

UNITED STATES PATENT OFFICE.

WALTER EDWIN TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

PROCESS OF SEPARATING AND PURIFYING OIL.

No Drawing.   Application filed August 11, 1920. Serial No. 402,901.

The invention relates to a process of separating oil from mixtures having an oil content.

The invention more particularly aims to recover and purify the oil which is intimately associated with other liquids and materials, and is particularly applicable for the recovery and purification of the hydrocarbon oil content in such waste products as base sediment.

The invention also relates to the recovery and purification of the oil content of refinery acid sludges.

Base sediment, commonly known as B—S is an emulsion of water and oil, sometimes containing solid impurities, all so closely associated, that it has always been troublesome, and with many varieties, impossible, to break up this emulsion and reclaim the oil in a pure state.

The present invention contemplates the process of separating the oil content from base sediment and from other liquids and solids with which it is intimately associated.

This invention is the result of the discovery that oil emulsions or mixtures when agitated with comminuted carbon in the presence of water are completely broken up, the oil and carbon joining together as an amalgamated mass or masses, owing to their mutual selective affinities, and thereby effecting the release of the water and other substances which were originally part of the oil mixture or emulsion.

To most effectively collect the oil content from its associated substances, it is necessary that the carbon and oil content be thoroughly intermixed in definite relative quantities to form the amalgamated mass or masses. These relative quantities change somewhat, according to the nature of the oil mixture, as will hereinafter be more fully described.

The amalgamated fuel mass of carbon and oil may be used as a composite fuel, which is highly satisfactory for many purposes. The present invention, however, contemplates the recovery of the substantially pure oil from the carbon particles. With the latter conception in mind, the amalgam may be subjected to a heat treatment of a relatively low temperature by passing the same through a retort in which the oil is distilled, conducted from the retort, and condensed, the carbon being recovered as particles, or in other cases as coke, depending upon the temperature and style of retort used and the nature of the final carbon product desired. If it is desired to re-use the same carbon particles for the purification of additional oil mixtures, the process is conducted so that they may be removed from the retort as particles. If the retort operation is conducted so as to produce coke or agglomerated carbon, the practice will then be to use fresh carbon particles with each charge of oil emulsion to be treated.

It has been found that the conditions in distilling the amalgam formed of fine particles of coal and oil are quite different from those when either of the two substances is separately distilled. The oil when combined as an amalgam distills at a lower temperature than when the oil is distilled separately. It is found also that the coal, if same has a volatile content, distills at a lower temperature when amalgamated with oil than if same is distilled separately. I have also found that oil, when made into an amalgam of carbon particles and then distilled, is materially improved in quality and contains a higher percentage of gasoline and light oils; therefore the oil, in addition to being separated, is purified by having same combined with the carbon when being distilled.

The invention also contemplates the removal of oil vapors from gases by passing the vapor bearing gases through water in which are suspended fine particles of carbon. The oil vapors condense and amalgamate with the carbon particles and form the same class of amalgam that is formed with liquid oils and carbon particles, and the fixed gases pass on, free from vapors, to a place of storage or use.

This is merely another use of the invention, and it will be understood that it contemplates recovering oil whenever mixed or emulsified with other substances.

In carrying out the foregoing process, assuming for the purpose of illustrating the present invention that a quantity of base sediment is to be treated for the purpose of removing the oil from other substances, the base sediment is introduced to a receptacle containing carbon particles and water, and the mass is thoroughly agitated to cause intimate contact of the carbon particles and oil content in the sediment, thereby causing the formation of the amalgam. If the base sediment contains a sufficient quantity of emulsified water, the carbon particles can be mixed directly with the same without the further addition of water. The agitation of the mass results in a breaking down of the emulsion and a liberation of water contained therein together with any solid earthy or other impurities in the oil or carbon. The oil content of the mass and the carbon particles possess mutual affinities, and after sufficient commingling form the amalgamated mass or masses from which the released water and impurities of the base sediment are excluded. The carbon and oil, when in proper ratio, have exclusive affinities and exclude the waters both released from the emulsion and any additional water used, and the solid impurities are carried away in suspension in the water. To effectively bring about the recovery and purification of the oil, when associated with other material, I have successfully employed comminuted carbon of approximately 100 mesh in the ratio of 2 pounds of carbon to 1 pound net oil content of the oil mixture. This ratio varies with different oils and different kinds of carbon. The ratio can be varied to suit the character of the product desired. The quantity of water employed may vary, a liberal quantity in most cases being preferable to effect a thorough washing during and after the formation of the amalgam.

The distillation of the oil may be carried out in any approved manner, but I have found that it is preferable to introduce the mixture of oil and coal to a suitable retort to be conveyed therethrough and subjected to heat, the oil being conducted from the retort and condensed, while the carbon may be recovered as particles, or as coke, depending upon the temperature and the product desired. A temperature of 300° C. has been successfully employed for distilling the oil from the amalgamated mass.

Having thus described the invention, what I claim is:

1. The process of separating hydrocarbon oil from other substances intimately commingled therewith, comprising introducing comminuted carbonaceous fuel to the oil, and in agitating the same in the presence of added water to cause the oil and the carbonaceous fuel particles to combine in a substantially plastic mass rejecting from said mass the other substances originally commingled with the oil.

2. The process of separating hydrocarbon oil from a mixture of oil and water, comprising introducing to said mixture a comminuted carbonaceous fuel having an affinity for the oil, and in agitating the mixture in the presence of water to cause the oil and comminuted carbonaceous fuel to combine forming a fuel amalgam substantially excluding the water originally contained in the oil.

3. The process of separating hydrocarbon oil from impure substances intimately commingled therewith, comprising introducing wet finely divided carbonaceous fuel to said hydrocarbon oil and in agitating the same to cause the oil and the carbonaceous fuel to combine as a substantially plastic mass, rejecting the water and other originally intermingled substances.

4. The process of separating hydrocarbon oil from impure substances intimately commingled therewith, comprising introducing wet finely divided carbonaceous fuel to said hydrocarbon oil, and in agitating the same to cause the oil and the carbonaceous fuel to combine as a substantially plastic mass rejecting the water and other originally intermingled substances, and in subjecting the said plastic mass to a heat treatment to recover oils by distillation.

5. The process of separating oil from substances intimately commingled therewith which comprises introducing to the intimately commingled substances, a comminuted carbonaceous mineral fuel, in agitating the mass in the presence of water to form a substantially plastic amalgam of oil and carbonaceous particles, rejecting the water and other substances originally commingled with the oil.

6. The process of separating oil from substances intimately commingled therewith which comprises introducing to the intimately commingled substances, a comminuted carbonaceous mineral fuel, in agitating the mass in the presence of water to form a substantially plastic amalgam of oil and carbonaceous particles, rejecting the water and other substances originally commingled with the oil, and in then subjecting the amalgam to heat to remove oils.

7. The process of separating hydrocarbon oil from water and other impurities intimately associated therewith, comprising commingling said hydrocarbon with a comminuted carbonaceous mineral fuel to cause the oil and carbonaceous fuel to combine and form a substantially plastic amalgam rejecting water and impurities originally associated with the oil.

In testimony whereof I affix my signature.

WALTER EDWIN TRENT.